United States Patent
Carlson

(10) Patent No.: US 8,498,836 B2
(45) Date of Patent: Jul. 30, 2013

(54) SYSTEM AND METHOD FOR DETECTING THERMOGRAPHIC ANOMALIES

(75) Inventor: Paul S. Carlson, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 1035 days.

(21) Appl. No.: 12/324,609

(22) Filed: Nov. 26, 2008

(65) Prior Publication Data

US 2010/0131225 A1   May 27, 2010

(51) Int. Cl.
*G01K 1/00* (2006.01)
*G01K 3/00* (2006.01)

(52) U.S. Cl.
USPC .......................................... 702/130; 374/137

(58) Field of Classification Search
USPC ............. 702/130, 34, 40, 81, 84, 127, 131, 702/134–136, 179, 182–183, 188–189, 199; 374/21–22, 29–30, 100, 102, 110–112, 137; 250/200, 330, 332, 334, 552–553, 559.01, 250/559.04–559.08, 559.1; 382/141, 152
See application file for complete search history.

(56) References Cited

U.S. PATENT DOCUMENTS

| 7,220,966 | B2 * | 5/2007 | Saito et al. ................ 250/341.6 |
| 7,732,768 | B1 * | 6/2010 | Haigh et al. ................ 250/332 |
| 2007/0087311 | A1 * | 4/2007 | Garvey et al. .................. 434/21 |

OTHER PUBLICATIONS

Marinetti et al., Statistical Analysis of IR Thermographic Sequences by PCA, 2004, Infrared Physics & Technology 46, pp. 85-91.*
Flir Systems, Inc., "ThermaCAM Researcher™ 2.8—Evaluate Thermal Performance in Real-Time With Powerful, Real-Time Digital Storage and Analysis Software," 3 pages, 2008.

* cited by examiner

*Primary Examiner* — Toan Le
(74) *Attorney, Agent, or Firm* — Perkins Coie LLP

(57) ABSTRACT

A thermographic analysis method and apparatus is provided. The method includes obtaining base-line and operational thermographic profiles of a subject area, calculating a difference profile from the base-line and operational thermographic profiles, and providing an indication from the difference profile. The indication may be also based on thermographic differences in portions of the subject area that are defined as thermographic zones.

20 Claims, 7 Drawing Sheets

SYSTEM AND METHOD FOR DETECTING THERMOGRAPHIC ANOMALIES

TECHNICAL FIELD

The following is related to thermographic systems and procedures and, more particularly, to systems and methods for detecting thermographic anomalies, analyzing thermographic data, and viewing associated thermographic images.

BACKGROUND

Thermographic instruments are commonly used to obtain thermographic profiles of subjects such as industrial machines or components of operating equipment. Inspecting a subject's thermographic profile can reveal whether a failure is imminent or a machinery adjustment is necessary. This information may be employed to direct maintenance efforts and to prevent unplanned shutdowns.

Inspecting a subject's instantaneous thermographic profile, however, may not provide sufficient information. For example, a subject may have an expected base-line thermographic profile and the subject's thermographic profile may vary from this base-line thermographic profile due to changes in operating conditions or environment. Such changes in operating conditions may include short-term load variations, ambient temperature variations, and power fluctuations. Variations in the subject's thermographic profile may be expected due to normal variations of these and other operating conditions. However, large variations in operating conditions, failures, component drift, long-term changes in operating conditions, and other conditions may lead to large changes to the subject's thermographic profile. Such changes may lead to unsafe and/or life-threatening situations.

Distinguishing abnormal thermographic profiles from a base-line thermographic profile and from normal thermographic profile variance may be difficult. Detecting abnormal thermographic profiles is further complicated when monitoring a subject over a lengthy duration, monitoring a large number of subjects, monitoring a subject having a relatively large normal range of thermographic profile variation, and/or the like.

DETAILED DESCRIPTION

Thermographic systems and procedures for detecting thermographic anomalies, analyzing thermographic data, and viewing an associated thermographic image are described. Also, the systems and procedures provide an indicator based, at least in part, on the thermographic data. The systems and procedures provide improved capabilities for thermal monitoring in certain environments. For example, the systems and procedures described herein may improve remote monitoring of thermal conditions within enclosed environments. In addition, systems and procedures may also enable monitoring of multiple remote environments from a remote and/or centralized monitoring facility.

Figure 1:
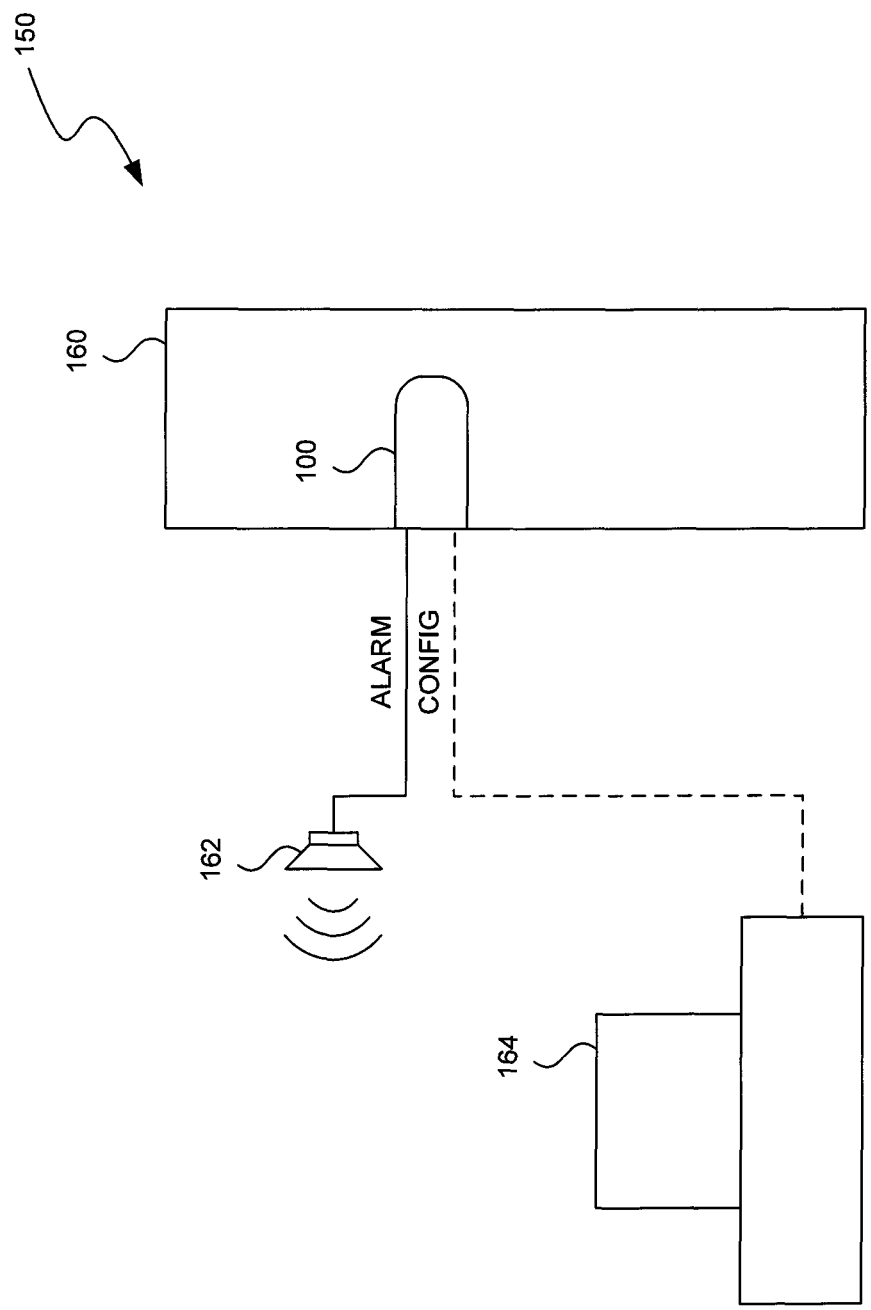
FIG. 1 illustrates an example environment for practicing the invention.

FIG. 1 illustrates environment 150 in which the invention may be practiced. As shown, environment 150 includes thermographic instrument 100, electrical panel 160, speaker 162, and host computer 164. In environment 150, thermographic instrument 100 is configured to monitor temperatures within electrical panel 160 and to provide indication signal ALARM based, at least in part, on time-invariant temperature changes within electrical panel 160. Optionally, thermographic instrument 100 may also interface with host computer 164 via optional configuration signal CONFIG.

As one example, thermographic instrument 100 is a stand-alone, real-time thermographic instrument that may be installed in an enclosed environment, such as electrical panel 160. In this example, thermographic instrument 100 may be employed to capture, monitor, and/or record thermographic information/data within electrical panel 160. Thermographic instrument 100 may then analyze captured thermographic data to determine whether the anomalous temperatures are present within electrical panel 160 and provide an indication on indication signal ALARM based, at least in part, on the determination. Thermographic instrument 100 is discussed in further detail with respect to FIG. 3, below.

By analyzing the thermographic data on thermographic instrument 100 instead of on an associated host computer, thermographic instrument 100 may decrease the response time between an occurrence of anomalous temperatures and a subsequent supervisory notification, may simplify and/or automate the process of thermally monitoring electrical panel 160, may increase the number of subjects that made be continuously monitored, may decrease monitoring band-width requirements, may enable continuous thermal monitoring of electrical panel 160, and/or the like.

While thermographic instrument 100 is employed to monitor temperatures within electrical panel 160, other thermographic instruments may be employed to monitor other subjects. For example, thermographic instruments may be employed to monitor machinery, electrical circuits, production lines, and/or the like. Monitored subject areas may also include both enclosed and non-enclosed areas. With certain thermographic instruments, moving subjects may also be monitored. However, certain thermographic instruments may be employed to monitor substantially stationary subjects.

In environment 150, thermographic instrument 100 is configured to provide indication signal ALARM to speaker 162. Indication signal ALARM and speaker 162 may be employed to provide an audible indication when anomalous temperatures are detected within electrical panel 160. However, in other environments, other indications may be employed to indicate thermal conditions in a subject area. For example, other indications may include a signal to an external system, an e-mail message, a short message service message, an instant message, a warning light, and/or the like. In one environment, indication signal ALARM is provided to a computer system, such as host computer 164, instead of or in addition to speaker 162.

Also, thermographic instrument 100 may be coupled to host computer 164 via optional configuration signal CONFIG, and host computer 164 may be used to configure and/or control the operation of thermographic instrument 100. Optional configuration signal CONFIG may include a USB, FireWire, serial, parallel, Ethernet, or other wired or wireless connection. Host computer 164 may be employed to download or otherwise transfer thermographic images and/or other thermographic data from thermographic instrument 100, configure the operation of thermographic instrument 100, and/or the like. In addition, host computer 164 may also store data that is downloaded or otherwise transferred from thermographic instrument 100, store configuration information for thermographic instrument 100, and/or the like. Also, an indication may be provided on optional configuration signal CONFIG instead of, or in addition to, indication signal ALARM. Moreover, host computer 164 may also be employed to store, display, and/or further analyze the downloaded thermographic data.

Host computer 164 may include a client computer, a laptop computer, a server, and/or the like. In addition, those skilled in the relevant art will appreciate that host computer 164 may include other computer system configurations, including Internet appliances, hand-held devices, wearable computers, cellular or mobile phones, multi-processor systems, microprocessor-based or programmable consumer electronics, set-top boxes, network PCs, mini-computers, mainframe computers, and/or the like. Host computer 164 may also include a single computer, or a distributed computing environment, where tasks or modules are performed by remote processing devices, which are linked through a communications network such as a local area network, wide area network, or the Internet. In a distributed computing environment, program modules or subroutines may be located in both local and remote memory storage devices. Aspects of host computer 164 described herein may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the interface may reside on a server computer, while corresponding portions reside on a client computer. Data structures and transmission of data particular to aspects of the interface are also encompassed within the scope of the disclosure.

Figure 2:
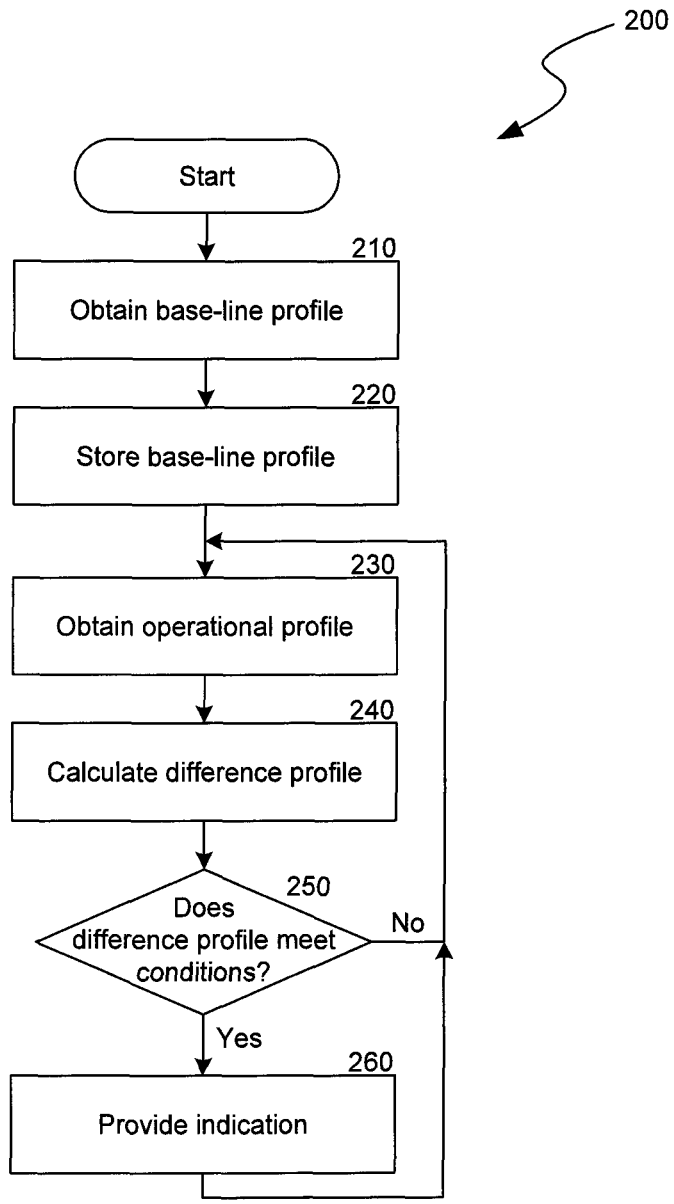
FIG. 2 illustrates a logical flow diagram of a process of detecting thermographic anomalies.

FIG. 2 illustrates process 200 for detecting thermographic anomalies. For clarity, process 200 is described below as being performed by thermographic instrument 100 while monitoring electrical panel 160. However, process 200 may also be, for example, performed by other instruments, processors, elements, and systems, whether or not such instruments, processors, elements, and systems are described herein. Further, process 200 may be employed on any subject, whether or not such subject is described herein.

Flowing from a start block, processing begins at step 210 where thermographic instrument 100 obtains a base-line profile. The base-line profile may include the thermographic data corresponding to a subject area, such as temperatures of components in electrical panel 160. The base-line profile may be formed from this thermographic data and may include a two-dimensional array of pixels where each of the pixels in the array corresponds to temperatures of portions of the subject area. If represented graphically, this thermographic data may form a thermographic image.

As one example, the base-line profile may be obtained by capturing a thermographic image upon installation of electrical panel 160, while electrical panel 160 is operating at normal load or under normal conditions, and/or the like. For example, the base-line profile may be employed to define expected temperatures within electrical panel 160.

At step 220, the base-line profile is stored. For example, the base-line profile may be stored in either random access memory, nonvolatile memory, and/or the like. As one example, the base-line profile may be stored in flash memory. By employing flash memory, the base-line profile may be available as a reference profile for extended periods of time such that temperature profiles captured over a wide range of other times may be easily compared against the base-line profile. This may enable thermographic instrument 100 to provide an indication based, at least in part, on time-invariant temperature changes within electrical panel 160. However, in environments where the base-line profile is frequently updated or power is continuously maintained to thermographic instrument 100, the base-line profile may be stored in random access memory.

From step 220, processing flows to step 230 where thermographic instrument 100 obtains an operational profile. An operational profile may include operational thermographic data corresponding to the subject area and may include a two-dimensional array of pixel data. The operational thermographic data may also form a thermographic image and may be obtained at any time. For example, it may be obtained during operations of electrical panel 160 and may be obtained at periodic intervals, at random intervals, or continuously. The operational thermographic data typically represents temperatures in electrical panel 160 at the time the operational thermographic data is captured. In one system, the operational thermographic data is processed in real-time to form an operational profile.

Processing then flows to step 240. At step 240, thermographic instrument 100 calculates a difference profile. This difference profile may be calculated in a real-time process and may be based, at least in part, on a difference between the operational profile and the stored base-line profile. For example, the difference profile may be calculated by calculating differences between the values of each pixel of the operational profile having a corresponding pixel in the stored base-line profile. As with step 230, difference profiles may be calculated continuously, at periodic intervals, or at random intervals.

In addition, thermographic instrument 100 may also compensate for movement occurring between the capture of the base-line profile and the operational profile. For example, thermographic instrument 100 may perform motion compensation if thermographic instrument 100 is moving relative to the subject area or if an operational profile is captured from a slightly different distance, height, angle, or other perspective from the subject area. Movement may be caused by shaking, thermal contraction, thermal expansion, and/or other causes. Motion compensation may be implemented through use of image alignment algorithms, image stabilization algorithms, motion compensation algorithms, image stitching algorithms, and or the like. These and other algorithms may improve thermographic instrument 100's ability to correlate (e.g., "line up") the base-line and operational profile data corresponding to physical features of electrical panel 160. After calculating a difference profile, processing flows to decision block 250.

At decision block 250, thermographic instrument 100 determines whether the difference profile meets a condition. Thermographic instrument 100 may determine whether the difference profile meets the condition based, at least in part, on a relative threshold. A relative threshold may be based, at least in part, on whether the difference profile indicates a relatively large temperature change within the subject area, indicates a relatively small temperature change within the subject area, indicates changes within certain portions of the subject area, and/or the like. In addition, thermographic instrument 100 may determine whether the difference profile meets the condition based, at least in part, on absolute thresholds (e.g., average temperatures, maximum temperatures, minimum temperatures, etc. of the operational profile).

Thermographic instrument 100 may be further configured to calculate the difference profile based, at least in part, on defined zones within the subject area. For example, zones may be employed to monitor certain portions of the subject area known or expected to have variable temperature(s) and/or that are particularly susceptible to temperature change. Accordingly, it may be beneficial to disregard minor temperature changes within one zone while more closely monitoring temperature changes within other zones.

As one example, a zone may be defined by downloading a base-line profile, an operational profile, and/or a difference profile to host computer 164. After downloading one or more of these profiles, a user may graphically view the profile(s) and define one or more zones within the subject area. As one example, a user may employ a drawing program to draw and/or overlay a zone definition over a graphical representation of the thermal profile. Zones may be defined as different geometric shapes and sizes to enable a user to designate and assess a specific area of interest. A user may also select from a plurality of predetermined shapes (e.g., line, rectangle, oval, multi-point polygon, etc.) to find a shape to most accurately define the area of interest. However, users may also define custom shapes.

In another example, thermographic instrument 100 may automatically suggest, identify, and/or define zones based, at least in part, on the difference profile. In this example, thermographic instrument 100 may define one zone including portions of the subject area having little or no temperature change. Likewise thermographic instrument 100 may define another zone including portions of the subject area having relatively large temperature changes. Thermographic instrument 100 may also determine whether the difference profile meets the condition based, at least in part, on the zone definitions. For example, separate thresholds may be employed for each zone.

If the difference profile does not meet the condition, processing returns to step 230 where thermographic instrument 100 obtains another operational profile. If the difference profile meets the condition, processing flows to step 360, where thermographic instrument 100 provides an indication. As described above, the indication may be provided via indication signal ALARM to any speaker, visual indicator, circuit, or system. From step 260, processing flows to step 230.

Figure 3:
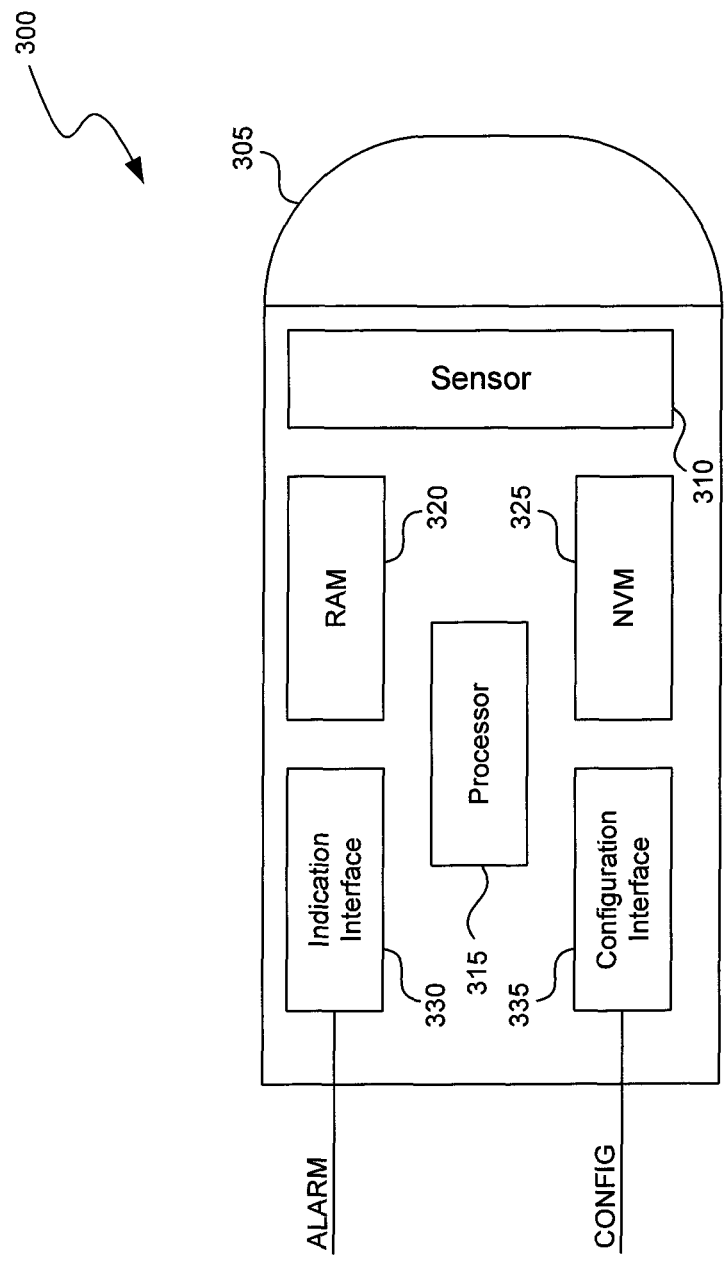
FIG. 3 illustrates a block diagram of an example of a thermographic instrument.

FIG. 3 illustrates a block diagram of thermographic instrument 300 that can be used to obtain and process thermographic data in accordance with the inventive systems and procedures of FIG. 2. Thermographic instrument 300 can include lens 305, sensor 310, processor 315, random access memory 320, non-volatile memory 325, indication interface 330, and configuration interface 335. Variations are possible, and thermographic instruments need not include all of these elements and/or may include additional elements (e.g., integrated display, buttons, switches, other user input devices, power supplies, mounting features, and/or the like).

Lens 305 and sensor 310 are configured to capture thermographic data. Lens 305 may include any lens suitable for use with a thermographic instrument. In certain environments, a wide-angle or ultra-wide angle lens may be employed as lens 305. For example, a fish-eye lens may be employed in certain thermographic instruments. In one such instrument, the lens may have a 120-degree field of view. In another instrument, the lens may have a 180-degree field of view. Sensor 310 may include an infrared sensor, a narrow-gap semiconductor integrated circuit, a bolometer, and/or the like. Sensor 310 typically provides thermographic data corresponding to processor 315 or to random access memory 320 or non-volatile memory 325 for later processing. This thermographic data may be a thermal profile or may be processed to form a thermographic image. If represented graphically, the thermographic data may be a thermographic image or may be processed to form a thermographic image.

Processor 315 is configured to control the operation of thermographic instrument 300 and may include a micro-processor, a micro-controller, a system on a chip, and/or the like. As discussed below, processor 315 is further configured to process data from sensor 310 to provide indication signal ALARM and to optionally communicate with host computer 164 via optional configuration signal CONFIG. In thermographic instrument 300, processor 315 also functions as a comparison circuit to calculate a difference profile from base-line and operational profiles.

Random access memory 320 and non-volatile memory 325 may be utilized by thermographic instrument 300 to store, among other things, thermographic data from sensor 310, applications, application data, and/or other data. Non-volatile memory 325 may also store basic input/output system ("BIOS") for controlling low-level operation of thermographic instrument 300, an operating system, applications, and/or the like. Random access memory 320 and non-volatile memory 325 may individually or collectively form a memory circuit.

Indication interface 330 and configuration interface 335 can utilize one or more communications technologies, such as USB, FireWire, serial, parallel, or other wired or wireless connection. Also, indication interface 330 and configuration interface 335 may include buffers, drivers, physical level interface circuits, media access control circuits, transceivers, and/or the like configured to provide indication signal ALARM and/or interface to host computer 164 via optional configuration signal CONFIG under the control of processor 315.

Figure 4:
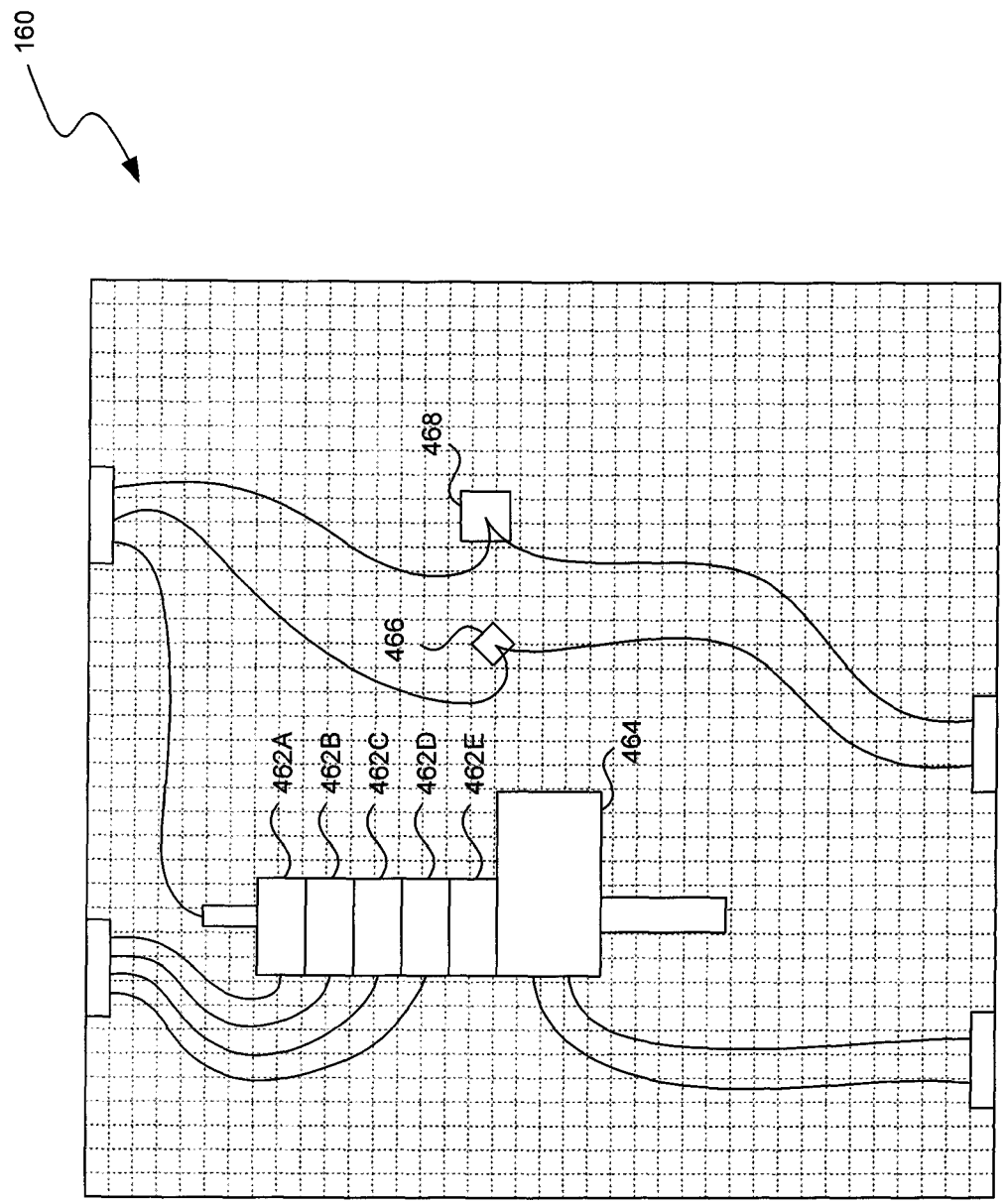
FIG. 4 illustrates one example of a subject that may be monitored with the thermographic instrument of FIG. 1.
Figure 5:
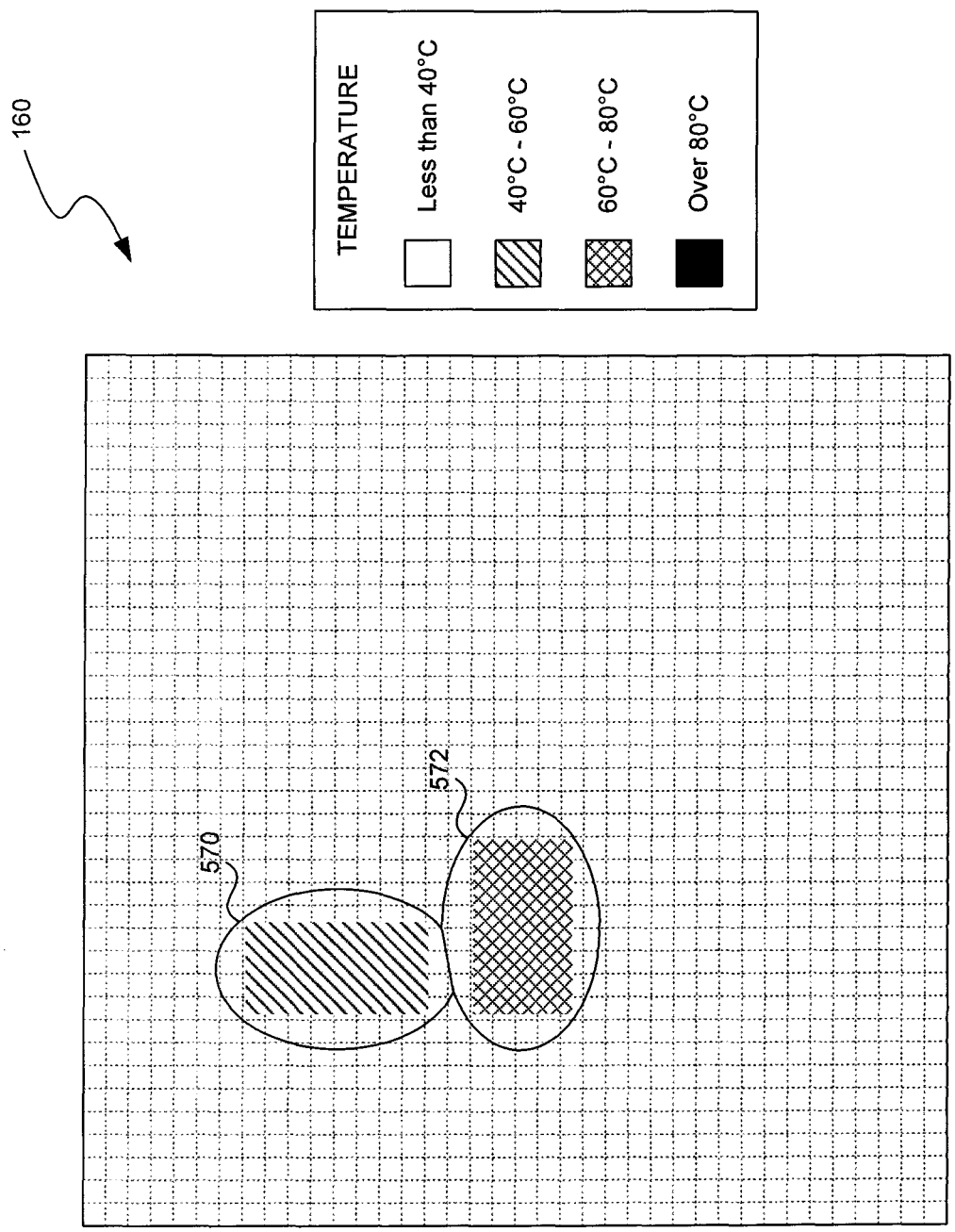
FIG. 5 illustrates one example of a base-line profile for the subject of FIG. 4.
Figure 6:
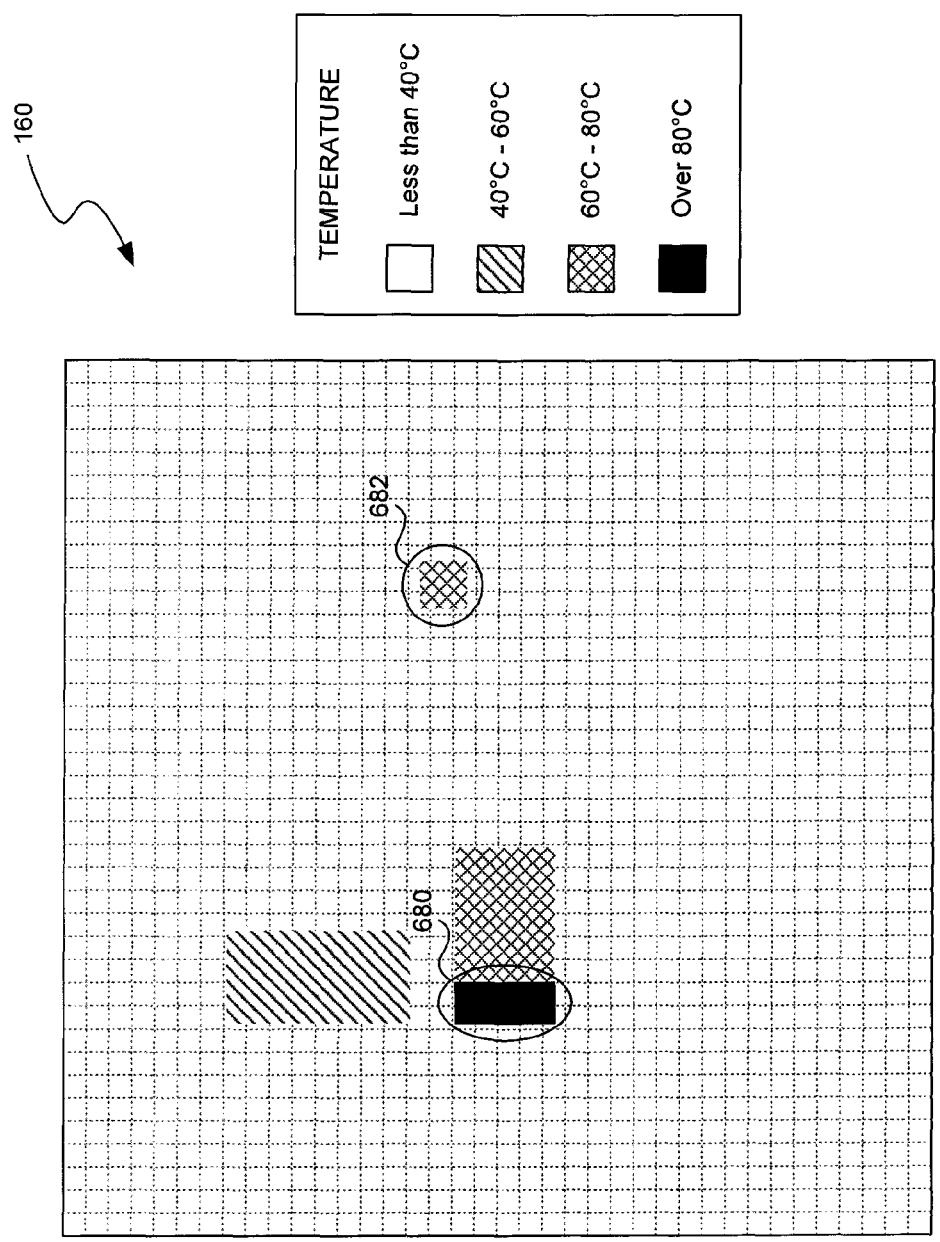
FIG. 6 illustrates one example of an operational profile for the subject of FIG. 4.
Figure 7:
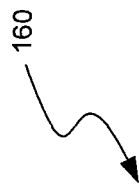
FIG. 7 illustrates one example of a difference profile for the subject of FIG. 4.
Figure 7:
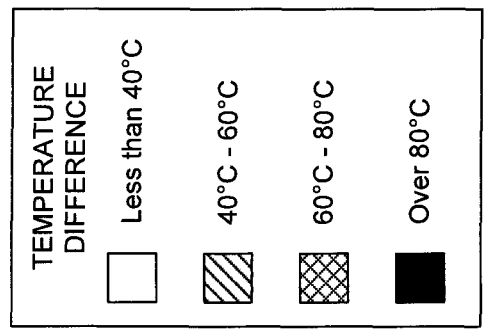
Figure 7:
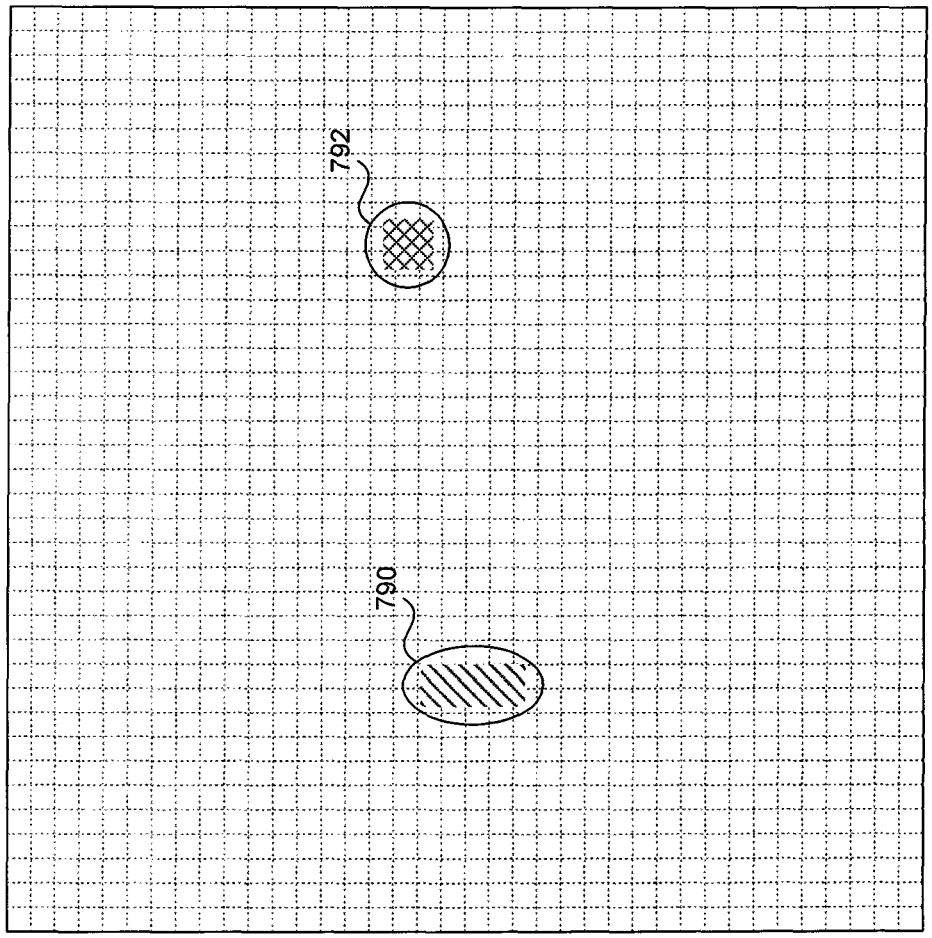

FIGS. 4-7 are provided to illustrate one environment in which the invention may be practiced. As discussed above, the invention may be practiced in many other environments. For purposes of illustration, specific temperature ranges are described in reference to FIGS. 4-7. However, these temperature ranges are provided merely as a descriptive aid. In practice, typical thermographic instruments will have more granular temperature ranges and higher resolution. FIG. 4 provides a visible light representation of electrical panel 160, FIG. 5 illustrates a base-line profile for electrical panel 160, FIG. 6 illustrates an operational profile for electrical panel 160, and FIG. 7 illustrates a difference profile calculated from the base-line and operational profiles of FIGS. 5-6.

As shown in FIG. 4, electrical panel 160 includes circuit breakers 462A-E, fuse 464, connection 466, and connection 468. One skilled in the art, however, will recognize that the representation in FIG. 4 is a simplified representation of the electrical panel. Other electrical panels may include other components or elements, such as meters, bus bars, ground bars, ballasts, monitoring circuitry, and/or the like. In addition, other electrical panels may include any number of these and other components or elements.

FIG. 5 illustrates a base-line profile for electrical panel 160. As shown in FIG. 5, the majority of electrical panel 160 was below 40° C. at the time the base-line profile was captured. However, area 570, corresponding to circuit breakers 462A-D, is between 40° C. and 60° C. In addition, area 572, corresponding to fuse 464, is between 60° C. and 80° C. For example, the circuit breakers within area 570 and area 572 may have elevated temperatures based, at least in part, on normal load currents and/or the like. In contrast, circuit breaker 462E may have a relatively low current and/or the like.

FIG. 6 illustrates an operational profile of electrical panel 160. As shown in FIG. 6, temperatures within area 680 have risen above 80° C. Also, temperatures within area 682 have risen to between 60° C. and 80° C. As shown in FIG. 7, temperatures within electrical panel 160 changed between the times the base-line and operational profiles were captured. For example, the portion of fuse 464 in area 790 rose between 20° C. and 40° C. Also connection 468 in area 792 has risen between 60° C. and 80° C. For example, these temperature increases may be due to electrical arcing, corrosion, resistive connections, increased load, and/or the like. For purposes of this illustration, the temperature increase in area 790 is expected while the temperature increase in area 792 is unexpected.

As one example of a configuration for a thermographic instrument, zones may be defined around each of circuit breakers 462A-E, fuse 464, connection 466, and connection 468. Based on the difference profile, an increased temperature variance may be allowed for the area corresponding to fuse 464. In contrast, other zones may be defined for circuit breakers 462A-E, connection 466, and connection 468, due to expectations that the temperatures of these components should not substantially increase during normal operation.

Many specific details of certain embodiments of the invention are set forth in the description and in the figures to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention.

From the foregoing, it will be appreciated that specific embodiments of the invention have been described herein for purposes of illustration, but that various modifications may be made without deviating from the invention. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention.

I claim:

1. A method for detecting thermographic anomalies, comprising:
   using a sensor, obtaining a base-line profile of base-line thermographic data corresponding to a subject area, wherein the base-line profile is obtained as a reference for the subject area, and wherein the base-line profile comprises a first set of pixel values;
   storing the base-line profile;
   using the sensor, obtaining an operational profile of operational thermographic data corresponding to the subject area, wherein the operational profile comprises a second set of pixel values;
   automatically aligning the base-line profile and the operational profile;
   calculating a difference profile based, at least in part, on a difference between the second set of pixel values of the operational profile and a corresponding first set of pixel values of the stored base-line profile;
   receiving a plurality of thermographic zones and at least one condition for each of the plurality of thermographic zones, wherein each thermographic zone defines a portion of the subject area; and
   providing an indication based, at least in part, on the calculated difference profile for each of the plurality of thermographic zones, wherein the indication includes whether the at least one condition for each of the plurality of thermographic zones is met, and further wherein meeting the at least one condition for a given thermographic zone indicates a thermographic anomaly.

2. The method of claim 1, wherein the method is performed on a stand-alone thermographic system.

3. The method of claim 1, wherein calculating the difference profile includes:
   for each pixel of the operational profile having a corresponding pixel of the stored base-line profile, calculating a difference between a value of the pixel of the operational profile and a value of the corresponding pixel of the stored base-line profile.

4. The method of claim 1, wherein each of the base-line thermographic data and the operational thermographic data includes at least a two-dimensional array of pixels, and wherein each of the pixels substantially corresponds to a temperature of a portion of the subject area.

5. The method of claim 1, wherein providing the indication is further based, in part, on at least one of a minimum, maximum, or average temperature of the subject area.

6. The method of claim 1, wherein the obtaining operational profile and calculating the difference profile are substantially real-time operations.

7. The method of claim 1, further comprising:
   providing at least one of the base-line profile, the operational profile, or the difference profile to a host computer system.

8. The method of claim 1, wherein providing the indication is further based, in part, on at least one of a minimum, maximum, or average temperature of the defined portion of the subject area.

9. The method of claim 1, wherein obtaining the operational profile comprises:
   compensating for movement in at least a portion of the subject area after the base-line profile is obtained.

10. The method of claim 1, wherein providing the indication is further based, in part, on time-invariant temperature changes of the plurality of thermographic zones.

11. The method of claim 1, further comprising automatically suggesting one or more thermographic zones based on the difference profile.

12. The method of claim 1, wherein not all of the conditions for the plurality of thermographic zones are the same.

13. An apparatus for detecting thermographic anomalies, comprising:
   a thermographic sensor configured to capture at least a base-line profile of thermographic data corresponding to a subject area and an operational profile of operational thermographic data corresponding to the subject area, wherein the base-line profile is obtained as a reference for the subject area, and wherein the base-line profile comprises a first set of pixel values, and the operational profile comprises a second set of pixel values;
   a storage circuit configured to store at least the base-line profile;
   a comparison circuit configured to receive the base-line profile and the operational profile, and to provide a difference profile for a plurality of identified thermographic zones based, at least in part, on a difference between the first set of pixel values of the base-line profile and a corresponding second set of pixel values of the operational profile within the plurality of thermographic zones, and to determine whether a condition for each of the plurality of thermographic zones is met;

an output circuit configured to provide an indication based, at least in part, on the difference profile; and an alarm circuit configured to provide an alarm signal when the difference profile in one or more of the plurality of thermographic zones meets the condition provided for that thermographic zone, wherein meeting the condition for a given thermographic zone indicates a thermographic anomaly, and wherein each thermographic zone spatially defines a portion of the subject area.

14. The apparatus of claim 13, wherein the apparatus is configured as a stand-alone, real-time thermographic system.

15. The apparatus of claim 13, wherein the thermographic sensor is an infrared sensor configured to capture a thermographic image, and wherein the thermographic sensor has at least a 120-degree field of view.

16. The apparatus of claim 13, further comprising:
a configuration interface configured to interface the apparatus to a host computer; to receive a definition of the plurality of thermographic zones, and to provide at least one of the difference profile, the base-line profile, or the operational profile to the host computer, wherein the definition of each of the plurality of thermographic zones defines at least one portion of the subject area.

17. The apparatus of claim 13, wherein the comparison circuit is further configured to calculate a difference between a value of each pixel of the operational profile and a value of each corresponding pixel of the base-line profile, wherein the thermographic sensor is a two-dimensional image sensor configured to capture a two-dimensional array of pixels, and wherein each of the pixels substantially corresponds to a temperature of a portion of the subject area.

18. An apparatus detecting thermographic anomalies, comprising:
means for obtaining a base-line profile of base-line thermographic data corresponding to a subject area, wherein the base-line profile is obtained as a reference for the subject area, and wherein the base-line profile comprises a first set of pixel values;

means for storing the base-line profile;

means for obtaining an operational profile of operational thermographic data corresponding to the subject area, wherein the operational profile comprises a second set of pixel values;

means for calculating a difference profile based, at least in part, on a difference between the second set of pixel values of the operational profile and a corresponding first set of pixel values of the stored base-line profile;

means for receiving a plurality of thermographic zones and at least one condition for each of the plurality of thermographic zones, wherein each thermographic zone defines a portion of the subject area; and means for providing an indication based, at least in part, on the calculated difference profile for each of the plurality of thermographic zone, wherein the indication indicates whether the at least one condition for each of the plurality of thermographic zones is met, and further wherein meeting the at least one condition for a given thermographic zone indicates a thermographic anomaly.

19. the apparatus of claim 18, further comprising:
means for compensating for movement in at least a portion of the subject area.

20. The apparatus of claim 18, wherein each of the base-line thermographic data and the operational thermographic data includes at least a two-dimensional array of pixels, and wherein each of the pixels substantially corresponds to a temperature of a portion of the subject area.

* * * * *

UNITED STATES PATENT AND TRADEMARK OFFICE
CERTIFICATE OF CORRECTION

| | | |
|---|---|---|
| PATENT NO. | : 8,498,836 B2 | Page 1 of 1 |
| APPLICATION NO. | : 12/324609 | |
| DATED | : July 30, 2013 | |
| INVENTOR(S) | : Carlson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 978 days.

Signed and Sealed this
Fifth Day of November, 2013

Teresa Stanek Rea
*Deputy Director of the United States Patent and Trademark Office*